(12) United States Patent
Inuzuka et al.

(10) Patent No.: US 11,855,307 B2
(45) Date of Patent: Dec. 26, 2023

(54) METAL MEMBER AND MANUFACTURING METHOD THEREOF

(71) Applicant: TOSHIBA ENERGY SYSTEMS & SOLUTIONS CORPORATION, Kawasaki (JP)

(72) Inventors: Riko Inuzuka, Kanagawa (JP); Norikazu Osada, Tokyo (JP); Masato Yoshino, Kanagawa (JP); Masahiro Asayama, Kanagawa (JP); Shohei Kobayashi, Kanagawa (JP); Tsuneji Kameda, Tokyo (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 18/094,546

(22) Filed: Jan. 9, 2023

(65) Prior Publication Data
US 2023/0163323 A1    May 25, 2023

Related U.S. Application Data

(62) Division of application No. 17/182,764, filed on Feb. 23, 2021, now Pat. No. 11,575,136.

(30) Foreign Application Priority Data

Mar. 18, 2020    (JP) .................................. 2020-047270

(51) Int. Cl.
*H01M 8/021* (2016.01)
*B32B 15/01* (2006.01)

(52) U.S. Cl.
CPC ........... *H01M 8/021* (2013.01); *B32B 15/013* (2013.01)

(58) Field of Classification Search
None
See application file for complete search history.

(56) References Cited

U.S. PATENT DOCUMENTS

| 2019/0348688 A1 | 11/2019 | Norby et al. |
| 2020/0102635 A1 | 4/2020 | Echigo et al. |

FOREIGN PATENT DOCUMENTS

| JP | 2015-122303 A | 7/2015 |
| JP | 2017-188426 | 10/2017 |

(Continued)

OTHER PUBLICATIONS

Liu et al. Crystal Structure, Chemical Stabilities and Electrical Conductivity of Fe-Doped Manganese Cobalt Spinel Oxides for SOFC Interconnect Coatings Journal of The Electrochemical Society, 2013, vol. 160, No. 11 F1316-F1321; DOI: 10.1149/2.114311jes (7 pages).

(Continued)

*Primary Examiner* — Humera N. Sheikh
*Assistant Examiner* — Kim S. Horger
(74) *Attorney, Agent, or Firm* — Foley & Lardner LLP

(57) ABSTRACT

There is provided a metal member capable of effectively preventing a coating layer from peeling off from a base. The metal member in an embodiment is a metal member that is used in a solid-oxide type electrochemical stack, and includes: a base formed of ferritic stainless steel; and a metal film provided on the base, in which the metal film includes a first metal layer containing Co and a second metal layer made of Mn, and is a stack in which the first metal layer and the second metal layer are sequentially stacked from the side of the base.

1 Claim, 2 Drawing Sheets

(56) References Cited

FOREIGN PATENT DOCUMENTS

WO     WO-2011/048307 A1     4/2011
WO     WO-2018/181926 A1     10/2018

OTHER PUBLICATIONS

U.S. Final Office Action on U.S. Appl. No. 17/182,764 dated Jun. 17, 2022 (8 pages).
U.S. Non-Final Office Action on U.S. Appl. No. 17/182,764 dated Dec. 20, 2021 (9 pages).
U.S. Notice of Allowance on U.S. Appl. No. 17/182,764 dated Sep. 30, 2022 (9 pages).
Wei, et al., "Oxidation Behavior and Conductivity of UNS 430 Stainless Steel and Crofer 22 APU with Spinel Coatings", ECS Transactions 2007, vol. 7, Issue 1, pp. 2135-2143, doi: 10.1149/1.2729328.

METAL MEMBER AND MANUFACTURING METHOD THEREOF

CROSS REFERENCE TO RELATED APPLICATIONS

This application is a divisional application of U.S. patent application Ser. No. 17/182,764, filed on Feb. 23, 2021, which is based upon and claims the benefit of priority from Japanese Patent Application No. 2020-047270, filed on Mar. 18, 2020; the entire contents of which are incorporated herein by reference.

FIELD

Embodiments of the present invention described herein relate generally to a metal member used in a solid-oxide type electrochemical stack, and a manufacturing method thereof.

BACKGROUND

An electrochemical device includes electrochemical cells each having an electrolyte membrane interposed between a fuel electrode and an air electrode. In general, the electrochemical device is formed of an electrochemical stack in which a plurality of electrochemical cells are stacked in order to increase the power output.

A solid-oxide type electrochemical stack includes electrochemical cells each having an electrolyte membrane composed of solid oxides, and the electrochemical cells can be used as solid oxide fuel cells (SOFC; Solid Oxide Fuel Cell) or solid oxide electrolysis cells (SOEC; Solid Oxide Electrolysis Cell).

Concretely, when used as the SOFC, electric energy is obtained by the reaction between hydrogen supplied to the fuel electrode and oxygen supplied to the air electrode through the electrolyte membrane, for example, under high temperature conditions. In contrast to this, when used as the SOEC, hydrogen is generated at the fuel electrode and oxygen is generated at the air electrode by water (steam) being electrolyzed, for example, under high temperature conditions.

The electrochemical cells are classified into a flat plate type, a cylindrical type, a cylindrical flat plate type, and so on according to their shape. For example, a flat-plate type electrochemical cell includes an air electrode, an electrolyte, and a fuel electrode each having a flat shape, and is composed of respective parts being stacked. Then, the electrochemical stack includes a separator interposed between a plurality of the electrochemical cells. The separator is a metal member and electrically connects a plurality of the electrochemical cells. Further, in the separator, a gas flow path is formed.

The metal member such as a separator used in the solid-oxide type electrochemical stack is required to have sufficient strength at high operating temperatures (600 to 1000° C.) and excellent oxidation resistance. In addition, the metal member is required to have a thermal expansion coefficient close to that of the electrochemical cell. For this reason, the metal member is often formed using, for example, ferritic stainless steel.

However, the ferritic stainless steel often contains chromium. Therefore, when chromium volatilizes, the ferritic stainless steel reacts with the materials composing the electrochemical cell and the performance of the electrochemical cell is sometimes degraded. In order to suppress the volatilization of chromium, the metal member generally includes a base of ferritic stainless steel coated with a coating layer. In addition to having the function of suppressing the volatilization of chromium, the coating layer of the metal member is required to have high electrical conductivity and a thermal expansion coefficient close to that of the electrochemical cell and the metal member. The coating layer of the metal member is formed using conductive oxides, for example, so as to meet these requirements.

Among the conductive oxides used in the coating layer of the metal member, spinel-based materials have attracted attention because they are high in conductivity and capable of effectively suppressing the volatilization of chromium. Conventionally, the deposition of the spinel-based material has been performed by attaching a spinel powder to the metal member. Recently, however, there has been proposed to electrochemically form a metal film on a base as a precursor by a plating method, and then sinter the metal film. For example, a Cu plating layer and a Mn plating layer are sequentially stacked on a thin Ni plating layer. Thereafter, Cu in the Cu plating layer and Mn in the Mn plating layer are mixed by heating to thereby form a composite oxide film containing Cu and Mn as the coating layer. This method is superior in terms of denseness, workability, and cost.

Conventionally, however, in the metal member used in the solid-oxide type electrochemical stack, the coating layer sometimes peels off from the base.

The problem to be solved by the present invention is to provide a metal member capable of effectively preventing a coating layer from peeling off from a base.

DETAILED DESCRIPTION

A metal member in an embodiment is a metal member used in a solid-oxide type electrochemical stack, and includes a base formed of ferritic stainless steel and a metal film provided on the base, in which the metal film includes a first metal layer containing Co and a second metal layer made of Mn, and is a stack in which the first metal layer and the second metal layer are sequentially stacked from the side of the base.

According to this embodiment, it is possible to provide a metal member capable of effectively preventing a coating layer from peeling off from a base, and a manufacturing method thereof.

[A] Regarding a Metal Member 1

Figure 1:
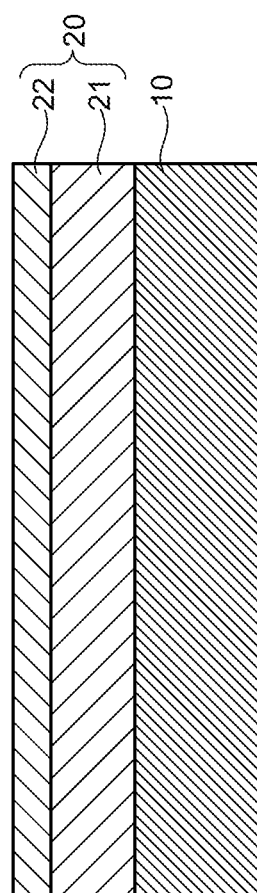
FIG. 1 is a view illustrating a cross section of a metal member 1 according to an embodiment.

FIG. 1 is a view illustrating a cross section of a metal member 1 according to an embodiment. Here, a part of the metal member 1, such as a separator used in a solid-oxide type electrochemical stack, is illustrated in an enlarged manner.

As illustrated in FIG. 1, the metal member 1 in this embodiment includes a base 10 and a metal film 20.

In the metal member 1, the base 10 is formed of ferritic stainless steel. The ferritic stainless steel of the base 10 is desirably made of, in mass %, C: 0.05% or less, Si: 0.15% or less, Mn: 0.5% or less, Cr: 25% or less, Al: 0.15% or less, Zr: 0.3% or less, La: 0.1% or less, W: 3.0% or less, Cu: 2% or less, and the balance composed of Fe and impurities.

In the metal member 1, the metal film 20 is provided on the base 10. Here, the metal film 20 is a stack composed of a first metal layer 21 and a second metal layer 22, in which the first metal layer 21 and the second metal layer 22 are sequentially stacked from the side of the base 10.

Of the metal film 20, the first metal layer 21 is a Co layer made of Co. In contrast to this, the second metal layer 22 is a Mn layer made of Mn, for example.

The first metal layer 21 and the second metal layer 22 composing the metal film 20 can be formed by various deposition methods, such as a plating method, a sputtering method, a thermal spraying method, and a vapor deposition method.

Then, the formed metal film 20 is heated at around 600 to 1000° C., for example, during the operation of a solid-oxide type electrochemical stack. Thereby, in the metal film 20, the metal element forming the first metal layer 21 and the metal element forming the second metal layer 22 are brought into a mixed state by thermal diffusion to be spinel (oxide), and thereby a coating layer (whose illustration is omitted) formed of a composite oxide is formed from the metal film 20.

The thicknesses of the first metal layer 21 and the second metal layer 22 composing the metal film 20 are adjusted appropriately so as to make the element ratio of the composite oxide forming the coating layer desired.

[B] SUMMARY

In this embodiment, the metal film 20 includes the first metal layer 21 made of Co and the second metal layer 22 made of Mn, and is a stack in which the first metal layer 21 and the second metal layer 22 are sequentially stacked from the side of the base 10. Although details will be described later, this configuration can effectively prevent the coating layer of the composite oxide, which is formed by the metal film 20 turning into spinel, from peeling off from the base 10.

[C] Modified Example

In the above-described embodiment, the case where the first metal layer 21 is a Co layer made of Co has been explained, but the above-described embodiment is not limited to this. The first metal layer 21 may be a Co-containing layer and may further contain at least one element of Fe, Cu, Ni, Zn, and Mo, in addition to Co. In this case, although details will be described later, the thermal expansion coefficient of a composite oxide is closer to that of the base 10 than the case where the first metal layer 21 is a Co layer made of Co. As a result, it is possible to more effectively prevent peeling of the coating layer of the composite oxide.

Figure 2:
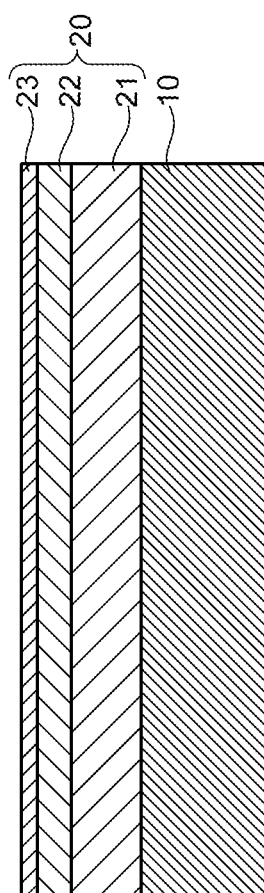
FIG. 2 is a view illustrating a cross section of a metal member 1 according to a modified example of the embodiment.

In the above-described embodiment, the case where the metal film 20 is a stack composed of two layers of the first metal layer 21 and the second metal layer 22 has been explained, but the above-described embodiment is not limited to this. FIG. 2 is a view illustrating a cross section of a metal member 1 according to a modified example of the embodiment. As illustrated in FIG. 2, the metal film 20 may be a stack containing a third metal layer 23, in addition to the first metal layer 21 and the second metal layer 22. The third metal layer 23 is a metal layer made of one of Fe, Cu, Ni, Zn, and Mo. In this case, although details will be described later, the thermal expansion coefficient of a composite oxide is closer to that of the base 10 than the case where the third metal layer 23 is not included. As a result, it is possible to more effectively prevent peeling of the coating layer of the composite oxide.

Incidentally, in FIG. 1 and FIG. 2, the metal film 20 is formed on one surface of the base 10, but the metal film 20 may also be formed on the other surface of the base 10.

EXAMPLE

There will be explained examples and a comparative example while using Table 1.

Table 1 illustrates compositions of the metal film 20 and test results in terms of the examples and the comparative example.

TABLE 1

|  |  | Example 1 | | Example 2 | | Example 3 | |
|---|---|---|---|---|---|---|---|
|  |  | Element | Element ratio | Element | Element ratio | Element | Element ratio |
| Composition of metal film 20 | First metal layer 21 | Co | 7 | Co | 7 | Co | 7 |
|  | Second metal layer 22 | Mn | 3 | Mn | 2 | Mn | 2 |
|  | Third metal layer 23 | — | — | Fe | 1 | Cu | 1 |
| Test results | Thermal expansion coefficient of metal film 20 ($\times 10^{-6}$/° C.) 600° C. | 9.6 | | 11 | | 10 | |
|  | 1000° C. | 14.5 | | 14.6 | | 14 | |
|  | Difference in thermal expansion coefficient between base 10 and metal film 20 ($\times 10^{-6}$/° C.) 600° C. | 0.9 | | −0.5 | | 0.5 | |
|  | 1000° C. | 0.7 | | −0.8 | | −0.2 | |

TABLE 1-continued

|  |  | Example 4 | | Example 5 | | Example 6 | |
| --- | --- | --- | --- | --- | --- | --- | --- |
|  |  | Element | Element ratio | Element | Element ratio | Element | Element ratio |
| Composition of metal film 20 | First metal layer 21 | Co | 7 | Co | 7 | Co | 7 |
|  | Second metal layer 22 | Mn | 2 | Mn | 2 | Mn | 2 |
|  | Third metal layer 23 | Ni | 1 | Ni | 1 | Zn | 1 |
| Test results | Thermal expansion coefficient of metal film 20 ($\times 10^{-6}/°$ C.) 600° C. | | 10.1 | | 10 | | 10.3 |
|  | 1000° C. | | 14 | | 13.5 | | 13.7 |
|  | Difference in thermal expansion coefficient between base 10 and metal film 20 ($\times 10-6/°$ C.) 600° C. | | 0.4 | | 0.5 | | 0.2 |
|  | 1000° C. | | −0.2 | | 0.3 | | 0.1 |

|  |  |  | Example 7 | | Comparative example | |
| --- | --- | --- | --- | --- | --- | --- |
|  |  |  | Element | Element ratio | Element | Element ratio |
| Composition of metal film 20 | First metal layer 21 | | CoNi | 8 | Mn | 3 |
|  | Second metal layer 22 | | Mn | 2 | Co | 7 |
|  | Third metal layer 23 | | — | — | — | — |
| Test results | Thermal expansion coefficient of metal film 20 ($\times 10^{-6}/°$ C.) | 600° C. | | 10.1 | Voids exist (measurement is impossible) | |
|  |  | 1000° C. | | 14 | Voids exist (measurement is impossible) | |
|  | Difference in thermal expansion coefficient between base 10 and metal film 20 ($\times 10-6/°$ C.) | 600° C. | | 0.4 | Voids exist (measurement is impossible) | |
|  |  | 1000° C. | | −0.2 | Voids exist (measurement is impossible) | |

[Fabrication of the Metal Member 1]

Example 1

In Example 1, a metal film 20 was formed by sequentially stacking a first metal layer 21 and a second metal layer 22 on a base 10 as illustrated in Table 1 (see FIG. 1).

Concretely, first, the base 10 formed of ferritic stainless steel was prepared.

As the base 10, a base formed of ferritic stainless steel having the following composition was prepared. Here, there was used ferritic stainless steel made of, in mass %, C: 0.02%, Si: 0.1%, Mn: 0.3%, Cr: 24%, Al: 0.1%, Zr: 0.25%, La: 0.071%, W: 2.0%, Cu: 1%, and the balance composed of Fe and impurities.

Then, the first metal layer 21 made of Co was formed on the base 10 by a plating method. Thereafter, the second metal layer 22 made of Mn was formed on the first metal layer 21 by a plating method.

Here, the thicknesses of the first metal layer 21 and the second metal layer 22 were adjusted so as to obtain an element ratio of Co:Mn=7:3, to then form each part. Concretely, in consideration of the atomic weight and density, the first metal layer 21 was formed so as to obtain its thickness of 7 μm, and the second metal layer 22 was formed so as to obtain its thickness of 3 μm. In other words, the metal film 20 was formed so as to obtain its thickness of 10 μm.

Then, the metal film 20 was heated at around 700° C., which is an operating temperature of the solid-oxide type electrochemical stack.

Thereby, in the metal film 20, the metal element forming the first metal layer 21 and the metal element forming the second metal layer 22 were brought into a mixed state by thermal diffusion to be spinel, and thereby a coating layer (whose illustration is omitted) formed of a composite oxide was formed.

Example 2

In Example 2, as illustrated in Table 1, unlike the case of Example 1, the first metal layer 21, the second metal layer 22, and a third metal layer 23 were stacked on the base 10 (see FIG. 2).

Concretely, first, the first metal layer 21 made of Co was formed on the base 10 by a plating method. Thereafter, the second metal layer 22 made of Mn was formed on the first metal layer 21 by a plating method. Further, the third metal layer 23 made of Fe was formed on the second metal layer 22 by a plating method.

Here, the thicknesses of the first metal layer 21, the second metal layer 22, and the third metal layer 23 were adjusted so as to obtain an element ratio of Co:Mn:Fe=7:2:1, to then form each part. Concretely, in consideration of the atomic weight and density, the first metal layer 21 was formed so as to obtain its thickness of 7 μm, and the second metal layer 22 was formed so as to obtain its thickness of 2 μm. Then, the third metal layer 23 was formed so as to obtain its thickness of 1 μm. In other words, the metal film 20 was formed so as to obtain its thickness of 10 μm.

Then, in the same manner as in the case of Example 1, the metal film 20 was heated. Thereby, in the metal film 20, the metal elements forming the first metal layer 21, the second metal layer 22, and the third metal layer 23 were brought into a mixed state by thermal diffusion to be spinel, and thereby a coating layer (whose illustration is omitted) formed of a composite oxide was formed.

Example 3

In Example 3, as illustrated in Table 1, the fabrication was performed by the same step as in Example 2, except for the point that the third metal layer 23 was made of Cu.

Example 4

In Example 4, as illustrated in Table 1, the fabrication was performed by the same step as in Example 2, except for the point that the third metal layer 23 was made of Ni.

Example 5

In Example 5, as illustrated in Table 1, the fabrication was performed by the same step as in Example 2, except for the point that the third metal layer 23 was made of Zn.

Example 6

In Example 6, as illustrated in Table 1, the fabrication was performed by the same step as in Example 2, except for the point that the third metal layer 23 was made of Mo.

Example 7

In Example 7, as illustrated in Table 1, the fabrication was performed by the same step as in Example 1, except for the point that the first metal layer 21 was made of CoNi and the thickness of the first metal layer 21 was 8 μm. Incidentally, as for CoNi, the element ratio (molar ratio) of the amount of substance of the Co element [Co] and the amount of substance of the Ni element [Ni] has the following relationship.

$$[Co]:[Ni]=87.5:12.5$$

COMPARATIVE EXAMPLE

In the comparative example, as illustrated in Table 1, a first metal layer 21 made of Mn was formed on a base 10 by a plating method so as to obtain its thickness of 3 μm. Thereafter, a second metal layer 22 made of Co was formed on the first metal layer 21 by a plating method so as to obtain its thickness of 7 μm. Except for this point, in the comparative example, the fabrication was performed by the same step as in Example 1 (see FIG. 1).

[Thermal Expansion Coefficient]

Table 1 illustrates the thermal expansion coefficient of the metal film 20 and the difference in the thermal expansion coefficient between the base 10 and the metal film 20. Here, the results obtained by performing measurements under the conditions of 600° C. and 1000° C. are illustrated. The measurement of the thermal expansion coefficient was performed in accordance with JIS Z 2285: 2003.

As illustrated in Table 1, in the examples, the difference in the thermal expansion coefficient between the base 10 and the metal film 20 was small, and the metal film 20 did not peel off from the base 10. In contrast to this, in the comparative example, the metal film 20 peeled off from the base 10, failing to measure the thermal expansion coefficient.

Incidentally, there has been explained, as an example, the case where the metal film 20 in each of the above-described examples has the ratio (element ratio) of the amount of substance of Co [Co], the amount of substance of Mn [Mn], and the amount of substance of Fe, Cu, Ni, Zn, or Mo [M] having the relationship described in the following equation (A). However, the metal film 20 can obtain suitable effects similarly even when the respective amounts of substances have the relationship described in the equation (B).

$$[Co]:[Mn]:[M]=7:2 \text{ to } 3:0 \text{ to } 1 \quad \text{Equation (A)}$$

$$[Co]:[Mn]:[M]=4 \text{ to } 8:0.5 \text{ to } 3:0.5 \text{ to } 3 \quad \text{Equation (B)}$$

The case where the value of [Co] is other than the values described in (B) indicates that voids and a peeling problem sometimes occur. The case where the value of [Mn] is the value falling outside the range described in (B) indicates that voids and a peeling problem sometimes occur. The case where the value of [M] is other than the values described in (B) indicates that voids and a peeling problem sometimes occur.

<Others>

While certain embodiments of the present invention have been described, these embodiments have been presented by way of example only, and are not intended to limit the scope of the inventions. Indeed, the novel methods described herein may be embodied in a variety of other forms; furthermore, various omissions, substitutions and changes in the form of the methods described herein may be made without departing from the spirit of the inventions. The accompanying claims and their equivalents are intended to cover such forms or modifications as would fall within the scope and spirit of the inventions.

REFERENCE SIGNS LIST

1 . . . metal member, 10 . . . base, 20 . . . metal film, 21 . . . first metal layer, 22 . . . second metal layer, 23 . . . third metal layer

What is claimed is:

1. A manufacturing method of a metal member being a manufacturing method of a metal member for being used in a solid-oxide type electrochemical stack, the metal member comprising:
   (a) a base formed of ferritic stainless steel; and
   (b) a metal film provided on the base, wherein the metal film includes a first metal layer containing Co and a second metal layer made of Mn, and is a stack in which the first metal layer and the second metal layer are sequentially stacked from a side of the base, the manufacturing method comprising:
   heating the metal film provided on the base to form a composite oxide,
   wherein an element ratio of an amount of the first metal layer to an amount of the second metal layer is from 8:2 to 7:3 in density such that the metal film is prevented from peeling off from the base.

* * * * *